US012812021B2

(12) United States Patent
Hwang et al.

(10) Patent No.: US 12,812,021 B2
(45) Date of Patent: Nov. 24, 2026

(54) TRAFFIC CONTROL SERVER, METHOD, AND SYSTEM BASED ON INFLUENCE CALCULATION UTILIZING METRIC INFORMATION

(71) Applicant: STCLab. Co., Ltd., Seoul (KR)

(72) Inventors: Changho Hwang, Yongin-si (KR); Kyungmin Kim, Seoul (KR); Hyung Joon Park, Seoul (KR)

(73) Assignee: STCLab Co., Ltd., Seoul (KR)

( * ) Notice: Subject to any disclaimer, the term of this patent is extended or adjusted under 35 U.S.C. 154(b) by 78 days.

(21) Appl. No.: 19/202,420

(22) Filed: May 8, 2025

(65) Prior Publication Data

US 2025/0274537 A1 Aug. 28, 2025

Related U.S. Application Data

(63) Continuation of application No. PCT/KR2025/002692, filed on Feb. 26, 2025.

(30) Foreign Application Priority Data

Feb. 28, 2024 (KR) ........................ 10-2024-0028751
Jul. 26, 2024 (KR) ........................ 10-2024-0099459

(51) Int. Cl.
*H04L 67/63* (2022.01)
*H04L 43/0882* (2022.01)
(Continued)

(52) U.S. Cl.
CPC .......... *H04L 67/63* (2022.05); *H04L 43/0882* (2013.01); *H04L 67/1008* (2013.01); *H04L 67/1014* (2013.01)

(58) Field of Classification Search
CPC ..... H04L 67/63; H04L 67/60; H04L 67/1008; H04L 67/101; H04L 67/1014;
(Continued)

(56) References Cited

U.S. PATENT DOCUMENTS

2020/0314035 A1* 10/2020 Gwock ............... H04L 43/0882
2022/0116324 A1* 4/2022 Kamei ..................... H04L 67/12
2024/0305533 A1* 9/2024 Bai ..................... H04L 41/0895

FOREIGN PATENT DOCUMENTS

KR 10-1654266 B1 9/2016
KR 10-2020-0014255 A 2/2020
KR 20200014255 A * 2/2020 ......... H04L 41/0213

OTHER PUBLICATIONS

Office Action issued in KR 10-2024-0099459; mailed by the Korean Patent Office on Aug. 21, 2024.

* cited by examiner

*Primary Examiner* — Frantz B Jean
(74) *Attorney, Agent, or Firm* — Studebaker Brackett PLLC

(57) ABSTRACT

The present disclosure is to calculate influence on metric information based on the number of connection requests by API group of the user terminals received from the service server through a communication module and the metric information, output change information of the metric information based on the number of connection requests by API group and the influence, extract a preset target traffic processing number by API group in connection with the change information of the metric information, and control the service server to control the traffic based on the target traffic processing number by API group.

14 Claims, 8 Drawing Sheets

(51) Int. Cl.
*H04L 67/1008* (2022.01)
*H04L 67/1014* (2022.01)

(58) Field of Classification Search
CPC ............ H04L 43/0882; H04L 43/0888; H04L 47/745; H04L 47/83; H04L 47/70; H04L 47/74; H04L 47/828; H04L 61/0896; H04L 61/14; H04L 61/147
See application file for complete search history.

FIG. 7

| Parameter / Group | Number of connection requests | CPU influence |
|---|---|---|
| First API group | $a_1$ | $x''_1$ |
| Second API group | $a_2$ | $x''_2$ |
| ⋮ | ⋮ | ⋮ |

FIG. 8

| Parameter / Group | Number of connection requests | Memory influence |
|---|---|---|
| First API group | $b_1$ | $y''_1$ |
| Second API group | $b_2$ | $y''_2$ |
| ⋮ | ⋮ | ⋮ |

FIG. 9

| Parameter / Group | Number of connection requests | Disk influence |
|---|---|---|
| First API group | $c_1$ | $z''_1$ |
| Second API group | $c_2$ | $z''_2$ |
| ⋮ | ⋮ | ⋮ |

| Parameter / Group | Number of connection requests | Network influence |
|---|---|---|
| First API group | $d_1$ | $Q_1''$ |
| Second API group | $d_2$ | $Q_2''$ |
| ⋮ | ⋮ | ⋮ |

TRAFFIC CONTROL SERVER, METHOD, AND SYSTEM BASED ON INFLUENCE CALCULATION UTILIZING METRIC INFORMATION

CROSS-REFERENCE TO RELATED APPLICATIONS

The present application is a continuation of International Patent Application No. PCT/KR2025/002692, filed on Feb. 26, 2025, which is based upon and claims the benefit of priority to Korean Patent Application No. 10-2024-0028751 filed on Feb. 28, 2024 and 10-2024-0099459 filed on Jul. 26, 2024. The disclosures of the above-listed applications are hereby incorporated by reference herein in their entirety.

BACKGROUND

1. Technical Field

The present disclosure relates to a traffic control server, method, and system based on influence calculation utilizing metric information.

2. Description of Related Art

As the number of concurrent users of a service server providing content services such as a course registration, a concert reservation, and a purchase event increases, the response speed of the service server providing the content services is often reduced or the service is interrupted.

The system may be composed of a WEB providing a web page composed of HTML (hypertext markup language), a WAS (web application server) processing an application service for a request message transmitted from the WEB, and an information base storing information that can be provided as a response to a query statement.

In the above-described system, in the case that the number of concurrent users surges, the WEB may experience a surge in traffic due to insufficient network bandwidth.

Recently, a research has been continuously conducted on the technology for efficiently controlling traffic in a traffic generation section and allowing an entry target to enter efficiently.

SUMMARY

The embodiment disclosed in the present disclosure is to provide an efficient control of traffic in a traffic generation area to allow efficient entry of an entry target.

Technical problems of the inventive concept are not limited to the technical problems mentioned above, and other technical problems not mentioned will be clearly understood by those skilled in the art from the following description.

In an aspect of the present disclosure, a traffic control server based on influence calculation utilizing metric information according to an embodiment may include a communication module configured to perform communication with user terminals attempting to enter a service server; a memory configured to store at least one process related to a traffic control based on an impact calculation using metric information; and a processor configured to perform an operation according to the process, wherein the processor may be configured to: calculate the influence on the metric information based on a number of connection requests by API group of the user terminals received from the service server through the communication module and the metric information, output change information of the metric information based on the number of connection requests by API group and the influence, extract a preset target traffic processing number by API group in connection with the change information of the metric information, and control the service server to control the traffic based on the target traffic processing number by API group, wherein the processor may be further configured to: when extracting the target traffic processing number by API group, based on the change in the metric information being higher than a preset level, compare the number of connection requests of a first API group and the number of connection requests of a second API group, and when extracting the target traffic processing number by API group, based on the number of connection requests of the first API group being greater than the number of connection requests of the second API group, extract a preset first target traffic processing number of the first API group to be smaller than the number of connection requests of the first API group to reduce the traffic.

In another aspect of the present disclosure, a traffic control system based on influence calculation utilizing metric information according to an embodiment may include a service server configured to provide a content service; user terminals attempting to enter the service server; and a traffic control server configured to perform communication with the service server and the user terminals, wherein the traffic control server may be configured to: calculate the influence on the metric information based on a number of connection requests by API group of the user terminals received from the service server and the metric information, output change information of the metric information based on the number of connection requests by API group and the influence, extract a preset target traffic processing number by API group in connection with the change information of the metric information, and control the service server to control the traffic based on the target traffic processing number by API group, wherein the traffic control server may be further configured to: when extracting the target traffic processing number by API group, based on the change in the metric information being higher than a preset level, compare the number of connection requests of a first API group and the number of connection requests of a second API group, and when extracting the target traffic processing number by API group, based on the number of connection requests of the first API group being greater than the number of connection requests of the second API group, extract a preset first target traffic processing number of the first API group to be smaller than the number of connection requests of the first API group to reduce the traffic.

Furthermore, a computer program stored in a computer-readable recording medium for executing a method for implementing the present disclosure may be further provided.

Furthermore, a computer-readable recording medium recording a computer program for executing a method for implementing the present disclosure may be further provided.

BRIEF DESCRIPTION OF THE FIGURES

FIGS. 3 to 14 are diagrams illustrating an example of a traffic control process based on calculating influence using metric information according to the present disclosure.

DETAILED DESCRIPTION

Figure 1:
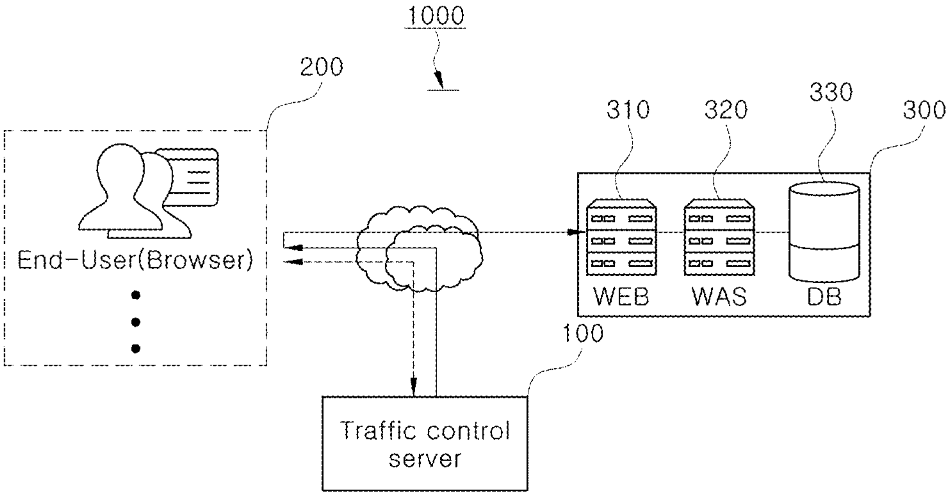
FIG. 1 is a diagram illustrating a traffic control system based on the influence calculation utilizing metric information according to the present disclosure.

In the drawings, the same reference numeral refers to the same element. This disclosure does not describe all elements of embodiments, and general contents in the technical field to which the present disclosure belongs or repeated contents of the embodiments will be omitted. The terms, such as "unit, module, member, and block" may be embodied as hardware or software, and a plurality of "units, modules, members, and blocks" may be implemented as one element, or a unit, a module, a member, or a block may include a plurality of elements.

Throughout this specification, when a part is referred to as being "connected" to another part, this includes "direct connection" and "indirect connection", and the indirect connection may include connection via a wireless communication network.

Furthermore, when a certain part "includes" a certain element, other elements are not excluded unless explicitly described otherwise, and other elements may in fact be included.

In the entire specification of the present disclosure, when any member is located "on" another member, this includes a case in which still another member is present between both members as well as a case in which one member is in contact with another member.

The terms "first," "second," and the like are just to distinguish an element from any other element, and elements are not limited by the terms.

The singular form of the elements may be understood into the plural form unless otherwise specifically stated in the context.

Identification codes in each operation are used not for describing the order of the operations but for convenience of description, and the operations may be implemented differently from the order described unless there is a specific order explicitly described in the context.

The operating principle and embodiments of the present disclosure are described below with reference to the attached drawings.

In this specification, the traffic control server according to the present disclosure includes all of various devices that can perform computational processing and provide results to the user. For example, the traffic control server may include all of a computer, a server device, and a portable terminal, or may be in the form of one of them.

Here, the computer may include, for example, a notebook, a desktop, a laptop, a tablet PC, a slate PC, and the like mounted with a web browser.

The server device is a server that communicates with an external device to process information, and may include an application server, a computing server, a database server, a file server, a mail server, a proxy server, and a web server.

A portable terminal is a wireless communication device that ensures portability and mobility, and may include all kinds of handheld-based wireless communication devices such as PCS (Personal Communication System), GSM (Global System for Mobile communications), PDC (Personal Digital Cellular), PHS (Personal Handyphone System), PDA (Personal Digital Assistant), IMT (International Mobile Telecommunication)-2000, CDMA (Code Division Multiple Access)-2000, W-CDMA (W-Code Division Multiple Access), WiBro (Wireless Broadband Internet) terminal, a smart phone, and the like, and a wearable device such as at least one of a watch, a ring, bracelets, anklets, a necklace, glasses, contact lenses, or a head-mounted device (HMD).

A traffic control system based on influence calculation utilizing metric information according to the present disclosure may calculate the influence on the metric information based on the number of connection requests by API group of user terminals received from the service server through the communication module and the metric information, output change information of the metric information based on the number of connection requests by API group and the influence, extract a preset target traffic processing number by API group in connection with the change information of the metric information, and control the service server to control the traffic based on the target traffic processing number by API group.

The traffic control system based on influence calculation utilizing metric information may efficiently control traffic in a traffic generation section and efficiently allow an entry target to enter.

Hereinafter, the traffic control system based on influence calculation utilizing metric information will be described in detail.

FIG. 1 is a diagram illustrating a traffic control system based on the influence calculation utilizing metric information according to the present disclosure.

Referring to FIG. 1, a traffic control system 1000 may include a traffic control server 100, a user terminal (End-User (Browser)) 200, and a service server 300.

The traffic control server 100 may be located between the user terminal (End-User (Browser)) 200 and the service server 300, and efficiently control traffic in a traffic generation section to efficiently manage the user terminal 200 entry into the service server 300. In this case, the user terminal 200 may be plural, and may be an end-user terminal. The end-user disclosed below may have the same meaning as the user terminal 200.

In addition, the traffic control server 100 may perform procedures of blocking, bypassing, and allowing entry management for the user terminal 200 requesting entry to the service server 300.

The blocking may mean a procedure for blocking a user from selecting a button (e.g., submit and confirm) that causes a specific action by transmitting blocking information to the user terminal 200 in the case that the number of accesses per second is at a macro level (e.g., N clicks per second, etc.).

The bypass may mean a procedure for bypassing a specific policy or major client to enter the service server 300 directly without waiting in a queue even when a queue for entry to the service server 300 has occurred.

The access permission management may mean a normal waiting management for access to the service server 300, and may mean a procedure for managing resources or states of the service server 300 that provides a content service by controlling access based on the number of access permissions.

At this time, the number of access permissions may mean the number of users who may simultaneously access a specific transaction (e.g., login button, course registration button, etc.) of the service server 300 at a given time by receiving a key from the access management server 100. In this case, the number of users may mean the number of user terminals that may actually access the service server 300 through the user terminal 200.

The service server 300 may include a WEB server 310, a WAS server 320, and a DB server 330. At this time, the service server 300 may provide various content services (first-come-first-served draw, course registration, concert reservation, accommodation reservation, ticket reservation, transportation reservation, etc.). Here, the service server 300 may include service server information. At this time, the service server information may be information collected from APM (application performance management) that monitors the WAS (web application server) of the service server 300. Specifically, the service server information may include at least one of CPU information, memory information, disk information, network information, processing capacity, number of threads, response time, concurrent terminal users, active services, active users, error rate, rejection rate, number of hits per hour, number of visitors per hour, number of hits per day, number of visitors per day, user WAS status, JDBC (java database connectivity) idle, JDBC allocation, JDBC active, total JVM (java virtual machine) memory, or JVM memory usage.

The WEB server 310 refers to a server that mainly processes a request from a client such as a web browser or a web crawler based on the HTTP (hypertext transfer protocol), and may reply with an HTTP response when receiving an HTTP request.

For example, the WEB server 310 may receive a file path name and return static file content (html, jpeg, css, etc.) that matches the path.

The WEB server 310 may transmit a request for providing dynamic content to the WAS, and receive the processing result from the WAS server 320 and transmit it to the client.

The WAS server 320 refers to an application server using HTTP, and may include a container that enables dynamic information to be used in a web server specialized in processing static HTTP information.

The WAS server 320 may be an application server for providing dynamic content that requires information base inquiry or various logic processing. The WAS server 320 may be a middleware (software engine) that executes an application on a computer or device via HTTP. The WAS server 320 may also be called a web container or a servlet container. In this case, the container may mean software that may execute JSP and Servlet.

The WAS server 320 may be applied in a distributed environment that processes functions such as distributed transactions, security, messaging, and thread processing.

Specifically, the WAS server 320 may implement a program execution environment, an information base connection function, and multiple transaction management functions. The transaction may mean a logical work unit.

The WAS server 320 may receive the corresponding information from the DB server 330 according to the user's request, and may generate and provide the result in real time according to the business logic. The WAS server 320 may be implemented in multiple modules, and the number of WA S servers 320 applied to each service server 300 may be different.

The DB server 330 may mean a configuration that stores and manages information. In this case, the DB server 330 may reply the corresponding information according to the request of the WAS server 320.

Figure 2:
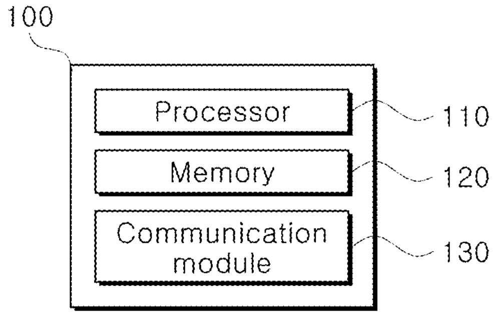
FIG. 2 is a diagram illustrating a configuration of the traffic control server of FIG. 1.
Figure 3:
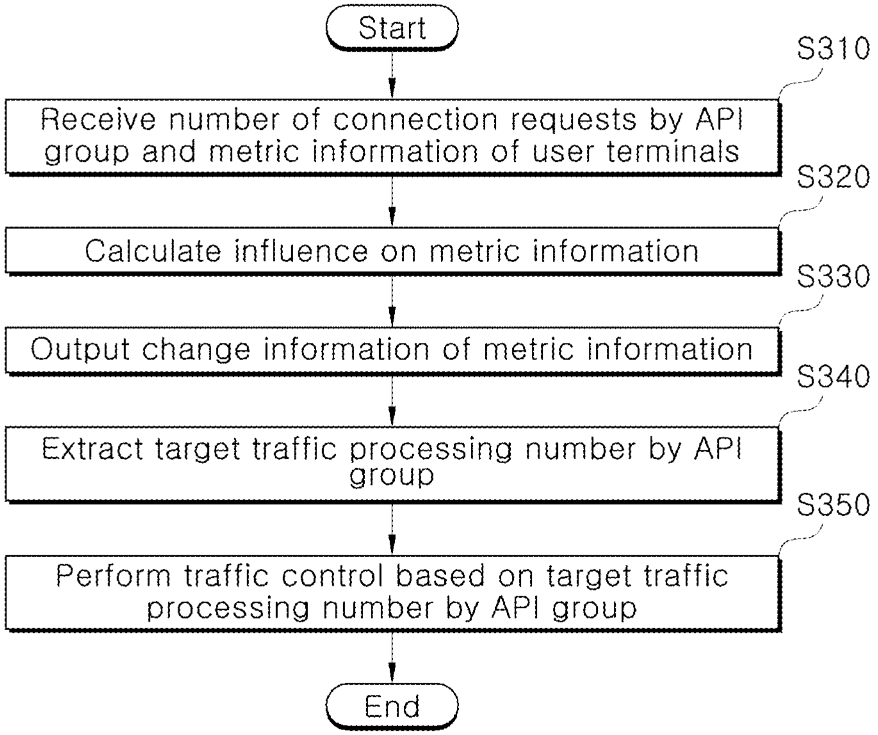

FIG. 2 is a diagram illustrating a configuration of the traffic control server of FIG. 1.

Referring to FIG. 2, the traffic control server 100 may include a processor 110, a memory 120, and a communication module 130.

First, the communication module 130 may perform communication with the user terminals 200 and the service server 300. Here, the communication module 130 may perform communication with the service server 300 and the user terminals 200 requesting entry to the service server 300. At this time, the communication module 130 may include at least one of a wired communication module or a wireless communication module.

The wired communication module may include various wired communication modules such as a Local Area Network (LAN) module, a Wide Area Network (WAN) module, or a Value Added Network (VAN) module, as well as various cable communication modules such as a Universal Serial Bus (USB), a High Definition Multimedia Interface (HDMI), a Digital Visual Interface (DVI), RS-232 (recommended standard 232), power line communication, or plain old telephone service (POTS).

The wireless communication module may include a wireless communication module that supports various wireless communication methods such as a WiFi module, a WiBro (Wireless broadband) module, GSM (Global System for Mobile Communication), CDMA (Code Division Multiple Access), WCDMA (Wideband Code Division Multiple Access), UMTS (Universal Mobile Telecommunications System), TDMA (Time Division Multiple Access), LTE (Long Term Evolution), 4G, 5G, and 6G.

The memory 120 may store information for an algorithm for controlling the operation of components within the device or a program that reproduces the algorithm. The processor 110 may communicate with the memory 120 and perform the above-described operation using the information stored in the memory 120. Here, the processor 110 and the memory 120 may be implemented as separate chips. In addition, the processor 110 and the memory 120 may be implemented as a single chip.

The memory 120 may store information supporting various functions of the device, a program for the operation of components within the device, may store input/output information, and may store a plurality of application programs or applications run on the device, information for the operation of the device, and commands. At least some of these application programs may be downloaded from an external server via wireless communication.

The memory 120 may include at least one type of storage medium among a flash memory type, a hard disk type, an SSD (Solid State Disk type), an SDD (Silicon Disk Drive) type, a multimedia card micro type, a card type memory (for example, an SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The memory 120 may store at least one process related to controlling traffic based on calculating influence using metric information. The processor 110 may perform an operation according to a process related to controlling traffic based on calculating influence using metric information.

The processor 110 may calculate the influence on the metric information based on the number of connection requests and metric information of the user terminals 200 by API group received from the service server 300 through the communication module 130.

Here, the processor 110 may calculate the influence on the metric information based on the number of connection requests of the first API group and the number of connection requests of the second API group among the number of connection requests by API group and the CPU information, memory information, disk information, and network information included in the metric information.

At this time, the processor 110 may calculate the influence on the metric information using an equation of a straight line based on a normal vector for the number of connection requests of the first API group, the number of connection requests of the second API group, and at least one of the CPU information, memory information, disk information, and network information.

The processor 110 may output change information of the metric information based on the number of connection requests and the influence by API group. At this time, the processor 110 may control the service server 300 to extract a preset target traffic processing number by API group in connection with the change information of the metric information, and to perform traffic control based on the target traffic processing number by API group.

For example, when extracting the target traffic processing number for each API group, in the case that the change in the metric information is higher than a preset level, the processor 110 may further compare the number of connection requests of the first API group and the number of connection requests of the second API group.

At this time, in the case that the number of connection requests of the first API group is greater than the number of connection requests of the second API group, the processor 110 may further extract a preset first target traffic processing number of the first API group to be smaller than the number of connection requests of the first API group to reduce traffic.

In addition, in the case that the number of connection requests of the second API group is greater than the number of connection requests of the first API group, the processor 110 may further extract a preset second target traffic processing number of the second API group to be smaller than the number of connection requests of the second API group to reduce traffic.

As another example, when extracting the target traffic processing number by API group, in the case that the change in metric information is higher than a preset level, the processor 110 may further compare the average usage time of the first content service linked to the number of connection requests of the first API group and the average usage time of the second content service linked to the number of connection requests of the second API group.

At this time, in the case that the average usage time of the first content service is greater than the average usage time of the second content service, the processor 110 may further extract a preset third target traffic processing number of the first API group to reduce traffic.

In addition, in the case that the average usage time of the second content service is greater than the average usage time of the first content service, the processor 110 may further extract a preset fourth target traffic processing number of the second API group to reduce traffic.

As another example, when extracting the target traffic processing number by API group, in the case that the change in metric information is higher than a preset level, the processor 110 may further compare the average usage ranking of the first content service linked to the number of access requests of the first API group and the average usage ranking of the second content service linked to the number of access requests of the second API group.

At this time, in the case that the average usage ranking of the first content service is faster than the average usage ranking of the second content service, the processor 110 may further extract a preset fifth target traffic processing number of the first API group to reduce traffic.

In addition, in the case that the average usage ranking of the second content service is faster than the average usage ranking of the first content service, the processor 110 may further extract a preset sixth target traffic processing number of the second API group to reduce traffic.

As another example, when extracting the target traffic processing number by API group, in the case that the change in metric information is higher than a preset level, the processor 110 may further compare the processing speed of the first content service linked to the number of connection requests of the first API group and the processing speed of the second content service linked to the number of connection requests of the second API group.

At this time, in the case that the processing speed of the first content service is slower than the processing speed of the second content service, the processor 110 may further extract a preset seventh target traffic processing number of the first API group to reduce traffic.

In addition, in the case that the processing speed of the second content service is slower than the processing speed of the first content service, the processor 110 may further extract a preset eighth target traffic processing number of the second API group to reduce traffic.

FIGS. 3 to 14 are diagrams illustrating an example of a traffic control process based on calculating influence using metric information according to the present disclosure.

Referring to FIGS. 3 to 14, a traffic control method based on calculating influence using metric information may include a receiving step S310, a calculating step S320, an output step S330, an extraction step S340, and a control step S350.

Figure 4:
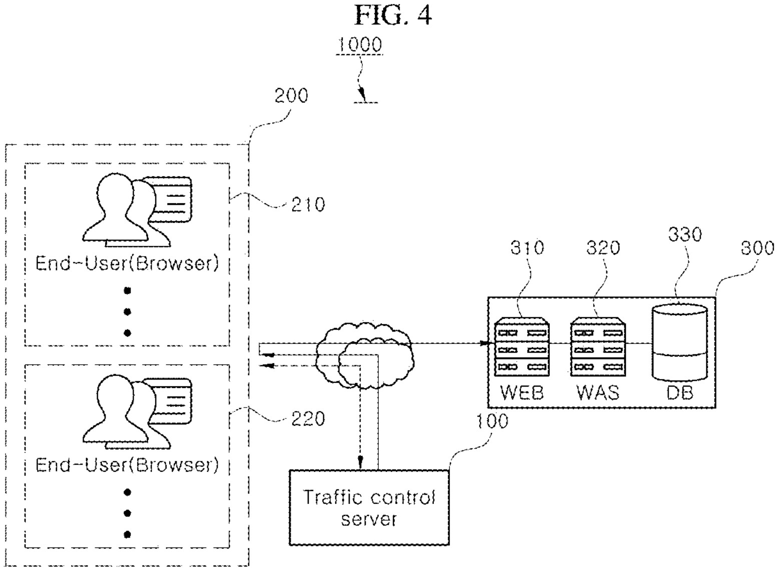

The communication module 130 may receive the number of connection requests by API group and the metric information of the user terminals 200 from the service server 300 (step S310). At this time, as shown in FIG. 4, the communication module 130 may receive the number of connection requests of the first API group 210, the number of connection requests of the second API group 220, and the metric information. Here, the API (Application Programming Interface) may be a series of rules or protocols that enable a software application to communicate with each other and exchange data, features, and functions.

Here, the metric information means information that changes over time, and may include CPU information, memory information, disk information, and network information. At this time, the metric information may be information that is worth tracking over time trends such as CPU usage, CPU status, memory usage, memory status, disk I/O usage, disk status, network usage, and network status.

The processor 110 may calculate the influence on the metric information based on the number of connection requests by API group of the user terminals 200 and the metric information (step S320). In this case, the influence means the degree of how much the service server 300 that processes the connection requests by API group of the user terminals 200 is using the resources.

Here, the processor 110 may calculate the influence on the metric information based on the number of connection requests by API group of the first API group 210 and the number of connection requests by the second API group 220 among the number of connection requests by API group, and CPU information, memory information, disk information, and network information included in the metric information.

Figure 5:
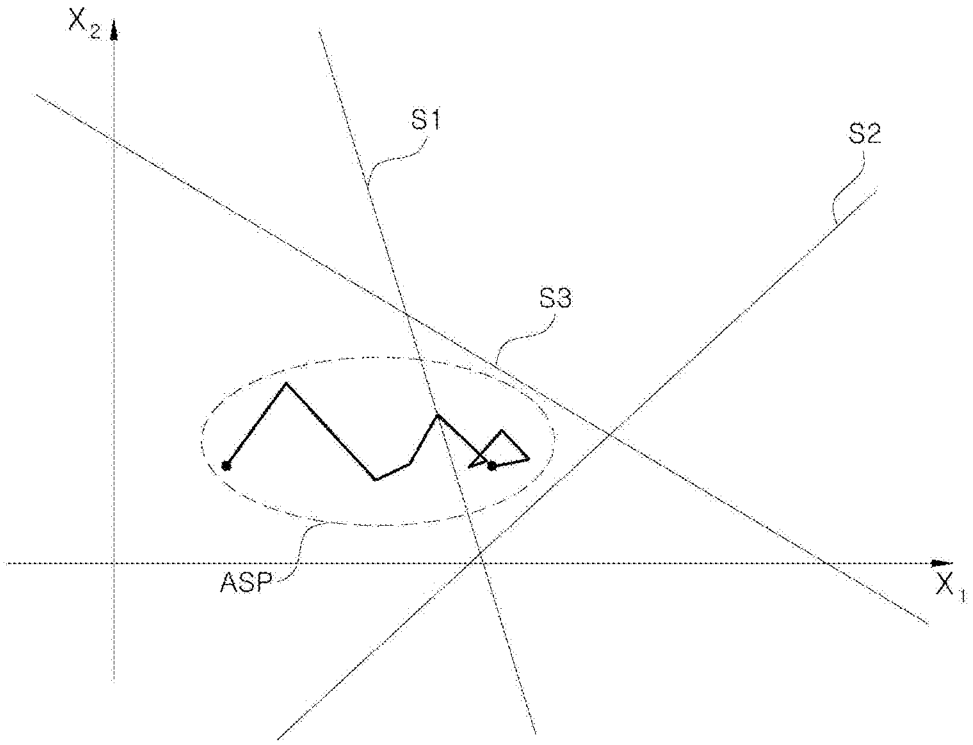
Figure 6:
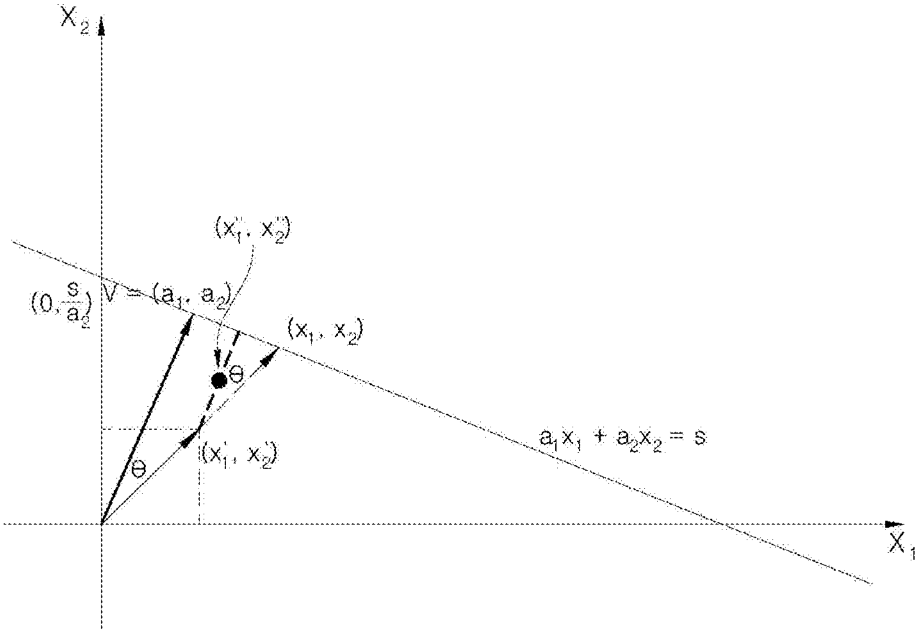

At this time, as shown in FIGS. 5 to 7, the processor 110 may calculate the CPU influence ($X_1$", $X_2$") on the metric information by using the number of connection requests $a_1$ of the first API group 210, the number of connection requests $a_2$ of the second API group 220, and the equations S1, S2, and S3 of a straight line based on the normal vector V of the CPU information.

For example, as shown in FIG. 5, when the connection request of the first API group 210 and the connection request of the second API group 220 occurs once among the total number of requests, the processor 110 may calculate the CPU influence ($X_1$", $X_2$") of the first API group 210 and the second API group 220 on the metric information by using the equation S1 of a straight line based on the normal vector V through the adaptive search process (ASP).

Later, in the case that the connection request of the first API group 210 and the connection request of the second API group 220 occurs twice among the total number of requests, the processor 110 may calculate the CPU influence ($X_1$", $X_2$") of the first API group 210 and the second API group 220 on the metric information using the equation S2 of a straight line based on the normal vector V through the adaptive search process (ASP).

Thereafter, in the case that the connection request of the first API group 210 and the connection request of the second API group 220 occur three times among the total number of requests, the processor 110 may calculate the CPU influence ($X_1$", $X_2$") of the first API group 210 and the second API group 220 on the metric information using the equation S3 of a straight line based on the normal vector V through the adaptive search process (ASP).

As shown in FIG. 6 and FIG. 7, when the number of connection requests of the first API group 210 and the number of connection requests of the second API group 220 among the total number of requests occurs a preset number of times, the processor 110 may calculate the CPU influence ($X_1$", $X_2$") of the first API group 210 and the second API group 220 on the metric information by using the equation S of a straight line based on the normal vector V through an adaptive search process.

Here, the equation S of a straight line may be expressed as Equation 1 as follows.

$$a_1X_1 + a_2X_2 = S \quad \text{[Equation 1]}$$

Herein, S may be the change in the metric information, $a_1$ may be the number of connection requests of the first API group, $a_2$ may be the number of connection requests of the second API group, $X_1$ may be the CPU influence of the first API group on the metric information, and $X_2$ may be the CPU influence of the second API group on the metric information.

In this case, as illustrated in FIG. 6, the processor 110 may find the previous CPU influence ($X_1$", $X_2$") based on the equation of a straight line ($a_1X_1+a_2X_2=S$), and may obtain the distance d from the previous CPU influence ($X_1$', $X_2$') to the equation of a straight line ($a_1X_1+a_2X_2=S$) based on the normal vector V.

Here, the distance d may be expressed as Equation 2 below.

$$d = \frac{|a_1X_1 + a_2X_2 - S|}{\sqrt{a_1^2 + a_1^2}} \quad \text{[Equation 2]}$$

Herein, d may be the distance, $a_1X_1+a_2X_2$ may be the equation of a straight line, S may be the change in metric information, $a_1$ may be the number of connection requests of the first API group, and $a_2$ may be the number of connection requests of the second API group.

Here, as illustrated in FIG. 6, the processor 110 may draw a line segment of the shortest distance from the previous CPU influence ($X_1$', $X_2$') and may consider the midpoint of the line segment as the current CPU influence ($X_1$", $X_2$") that the first API group 210 and the second API group 220 have on the metric information. At this time, the processor 110 may recursively perform the process of finding the previous CPU influence ($X_1$', $X_2$') and the current CPU influence ($X_1$", $X_2$").

That is, through Equation 3 to Equation 5 below, a correlation formula between the previous CPU influence and the current CPU influence may be obtained.

First, the unit vector u of the vector v that points to a straight line in the previous CPU influence ($X_1$', $X_2$') may be expressed as Equation 3. At this time, the sign (sgn) of the vector may be expressed as Equation 4.

$$\underline{u} = \frac{v}{|\underline{v}|} \quad \text{[Equation 3]}$$

$$\text{sgn is positive, } a_1X_1 + a_2X_2 < S \quad \text{[Equation 4]}$$

$$\text{sgn is negative, } a_1X_1 + a_2X_2 > S$$

Based on Equation 3 and Equation 4, it may be expressed as Equation 5.

$$X_2 = X_1 + \left(\frac{1}{2}d\underline{u} \times \text{sgn}\right) \quad \text{[Equation 5]}$$

Herein, $X_1$ may be the previous influence, and $X_2$ may be the next influence.

Therefore, based on Equation 5, it may be generalized to Equation 6 as follows.

$$X_n = X_{n-1} + \left(\frac{1}{2}d_n\underline{u_n} \times \text{sgn}_n\right) \quad \text{[Equation 6]}$$

Herein, $X_{n-1}$ may be the previous influence, and $X_n$ may be the next influence.

As shown in FIG. 8, when the connection request of the first API group 210 and the connection request of the second API group 220 occur a preset number of times, the processor 110 may calculate the memory influence ($Y_1$", $Y_2$") that the first API group 210 and the second API group 220 have on the metric information by using the equation of a straight line based on the normal vector through the adaptive search process.

Here, the equation of a straight line may be expressed as Equation 7 as follows.

$$b_1Y_1 + b_2Y_2 = S \quad \text{[Equation 7]}$$

Herein, S may be the change in metric information, $b_1$ may be the number of connection requests of the first API group, $b_2$ may be the number of connection requests of the second API group, $Y_1$ may be the memory influence of the first API group on the metric information, and $Y_2$ may be the memory influence of the second API group on the metric information.

Here, the processor 110 may find the previous memory influence ($Y_1'$, $Y_2'$) based on the equation of a straight line ($b_1Y_1+b_2Y_2=S$), and may obtain the distance from the previous memory influence Y1', Y2' to the equation of a straight line ($b_1Y_1+b_2Y_2=S$) based on the normal vector.

At this time, the processor 110 may recursively perform the process of finding the previous memory influence ($Y_1'$, $Y_2'$) and the current memory influence ($Y_1''$, $Y_2''$) in the same way as the method of finding the CPU influence.

As shown in FIG. 9, when the connection request of the first API group 210 and the connection request of the second API group 220 occur a preset number of times, the processor 110 may calculate the disk influence ($Z_1''$, $Z_2''$) of the first API group 210 and the second API group 220 on the metric information using the equation of a straight line based on the normal vector through the adaptive search process.

Here, the equation of a straight line may be expressed as Equation 8 as follows.

$$c_1Z_1 + c_2Z_2 = S \quad \text{[Equation 8]}$$

Herein, S may be the change in metric information, $c_1$ may be the number of connection requests of the first API group, $c_2$ may be the number of connection requests of the second API group, $Z_1$ may be the disk influence of the first API group on the metric information, and $Z_2$ may be the disk influence of the second API group on the metric information.

Here, the processor 110 may find the previous disk influence ($Z_1'$, $Z_2'$) based on the equation of a straight line ($c_1Z_1+c_2Z_2=S$), and may find the distance from the previous disk influence ($Z_1'$, $Z_2'$) to the equation of a straight line ($c_1Z_1+c_2Z_2=S$) based on the normal vector.

In this case, the processor 110 may recursively perform the process of finding the previous disk influence ($Z_1'$, $Z_2'$) and the current disk influence ($Z_1''$, $Z_2''$) in the same way as the method of finding the CPU influence.

Figures 10, 11:
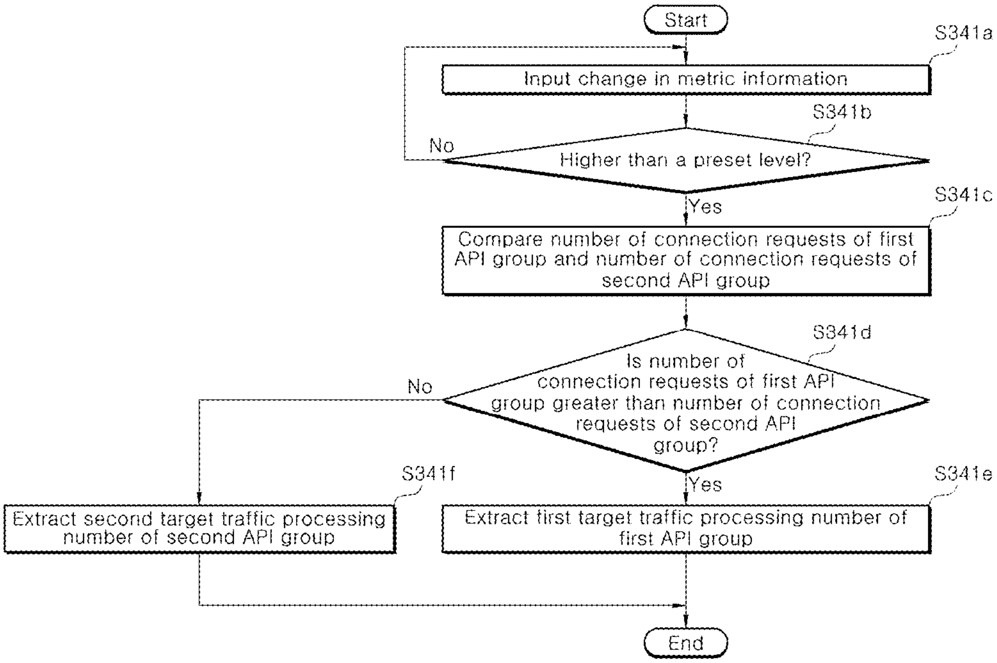

As shown in FIG. 10, when the connection request of the first API group 210 and the connection request of the second API group 220 occur a preset number of times, the processor 110 may calculate the network influence ($Q_1''$, $Q_2''$) of the first API group 210 and the second API group 220 on the metric information by using the equation of a straight line based on the normal vector through the adaptive search process.

Here, the equation of a straight line may be expressed as Equation 9 as follows.

$$d_1Q_1 + d_2Q_2 = S \quad \text{[Equation 9]}$$

Herein, S may be the change in metric information, $d_1$ may be the number of connection requests of the first API group, $d_2$ may be the number of connection requests of the second API group, $Q_1$ may be the network influence of the first API group on the metric information, and $Q_2$ may be the network influence of the second API group on the metric information.

Here, the processor 110 may find the previous network influence ($Q_1'$, $Q_2'$) based on the equation of a straight line ($d_1Q_1+d_2Q_2=S$), and may obtain the distance from the previous network influence ($Q_1'$, $Q_2'$) to the equation of a straight line ($d_1Q_1+d_2Q_2=S$) based on the normal vector.

In this case, the processor 110 may recursively perform the process of finding the previous network influence ($Q_1'$, $Q_2'$) and the current network influence ($Q_1''$, $Q_2''$) in the same way as finding the CPU influence.

Meanwhile, the processor 110 may also generate a second-order equation, a third-order equation, or a fourth-order equation based on at least two or more influences among the number of connection requests of the first API group, the number of connection requests of the second API group, the CPU influence ($X_1''$, $X_2''$), the memory influence ($Y_1''$, $Y_2''$), the disk influence ($Z_1''$, $Z_2''$), and the network influence ($Q_1''$, $Q_2''$). Since the processor 110 may analyze the influence on the metric information more precisely based on the second-order equation, the third-order equation, or the fourth-order equation, it may control the traffic more efficiently in the traffic generation section and allow the entry target to enter more efficiently.

In addition, the processor 110 may analyze the influence of two pieces of information among CPU information, memory information, disk information, and network information on metric information using the equation of a straight line based on a normal vector.

As an example, the processor 110 may analyze the influence of CPU information and memory information on metric information using the equation of a straight line based on a normal vector. As another example, the processor 110 may analyze the influence of CPU information and disk information on metric information using the equation of a straight line based on a normal vector.

As another example, the processor 110 may analyze the influence of CPU information and network information on the metric information using the equation of a straight line based on a normal vector. As another example, the processor 110 may analyze the influence of memory information and disk information on the metric information using the equation of a straight line based on a normal vector.

As another example, the processor 110 may analyze the influence of memory information and network information on the metric information using the equation of a straight line based on a normal vector. As another example, the processor 110 may analyze the influence of disk information and network information on the metric information using the equation of a straight line based on a normal vector.

The processor 110 may output change information of metric information based on the number of access requests and influence by API group (step S330). Thereafter, the processor 110 may extract the preset target traffic processing number by API group in connection with the change information of the metric information (step S340). For example, in the case that the metric in the change information of the metric information is 70, the threshold is 90, and the metric influence is 1.5, the processor 110 may output the target traffic processing number as 13.

Thereafter, the processor 110 may control the service server 300 to perform traffic control based on the target traffic processing number by API group (step S350).

For example, as shown in FIG. 11, when extracting the target traffic processing number by API group, the processor 110 inputs the change in the metric information (step S341*a*), and in the case that the change in metric information is higher than a preset level (example of step S341*b*), the number of connection requests of the first API group and the number of connection requests of the second API group may be further compared (step S341*c*).

At this time, in the case that the number of connection requests of the first API group is greater than the number of connection requests of the second API group (example of step S341*d*), the processor 110 may further extract the preset first target traffic processing number of the first API group to be less than the number of connection requests of the first API group to reduce traffic (step S341*e*).

In addition, in the case that the number of connection requests of the second API group is greater than the number of connection requests of the first API group (No in step S341*d*), the processor 110 may further extract the preset second target traffic processing number of the second API group to be smaller than the number of connection requests of the second API group, to reduce traffic (step S341*f*). Here, the first target traffic processing number may be different from the second target traffic processing number.

Figure 12:
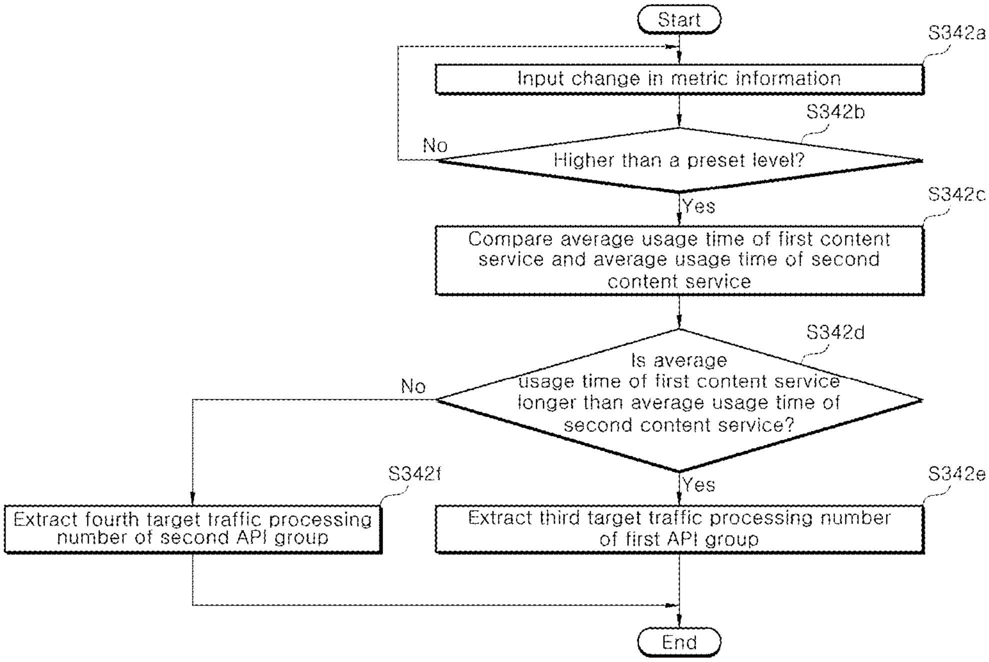

As another example, as illustrated in FIG. 12, when extracting the target traffic processing number by API group, the processor 110 inputs the change in the metric information (step S342*a*), and in the case that the change in the metric information is higher than a preset level (Yes in step S342*b*), the processor may further compare the average usage time of the first content service linked to the number of connection requests of the first API group and the average usage time of the second content service linked to the number of connection requests of the second API group (step S342*c*).

Here, the first content service and the second content service are different content services, and may be first-come-first-served draws, concert reservations related to course registration, accommodation reservations, ticket reservations, transportation reservations, and the like At this time, in the case that the average usage time of the first content service is longer than the average usage time of the second content service (Yes in step S342*d*), the processor 110 may further extract the preset third target traffic processing number of the first API group to reduce traffic (step S342*e*).

In addition, in the case that the average usage time of the second content service is longer than the average usage time of the first content service (No in step S342*d*), the processor 110 may further extract the preset fourth target traffic processing number of the second API group to reduce traffic (step S342*f*). Here, the third target traffic processing number may be different from the fourth target traffic processing number.

Figure 13:
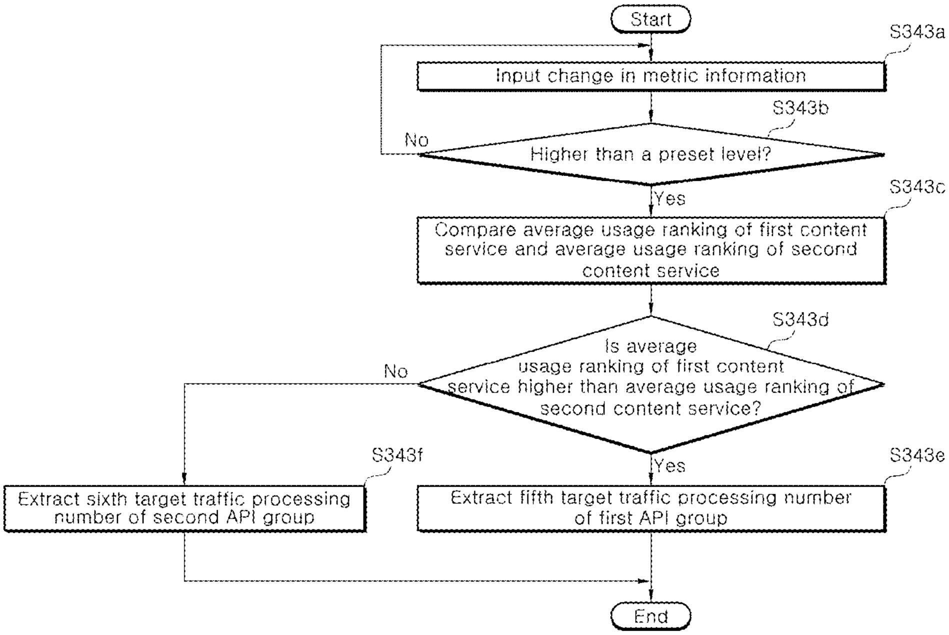

As another example, as illustrated in FIG. 13, when extracting the target traffic processing number by API group, the processor 110 inputs the change in metric information (step S343*a*), and in the case that the change in the metric information is higher than a preset level example of (step S343*b*), the average usage ranking of the first content service linked to the number of access requests of the first API group and the average usage ranking of the second content service linked to the number of access requests of the second API group may be further compared (step S343*c*).

Here, the first content service and the second content service are different content services, and may be first-come-first-served draws, concert reservations related to course registration, accommodation reservations, ticket reservations, transportation reservations, and the like.

At this time, in the case that the average usage ranking of the first content service is faster than the average usage ranking of the second content service (Yes in step S343*d*), the processor 110 may further extract the preset fifth target traffic processing number of the first API group to reduce traffic (step S343*e*).

In addition, in the case that the average usage ranking of the second content service is faster than the average usage ranking of the first content service (No in step S343*d*), the processor 110 may further extract the preset sixth target traffic processing number of the second API group to reduce traffic (step S343*f*). Here, the fifth target traffic processing number may be different from the sixth target traffic processing number.

Figure 14:
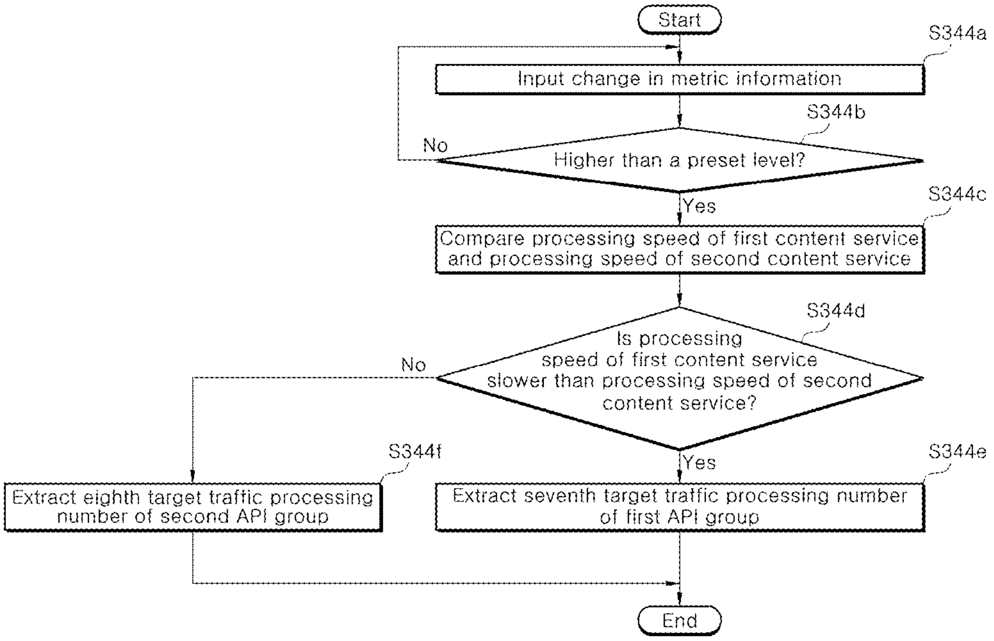

As another example, as illustrated in FIG. 14, when extracting the target traffic processing number by API group, the processor 110 inputs the change in metric information (step S344*a*), and in the case that the change in metric information is higher than a preset level (example of step S344*b*), the processing speed of the first content service linked to the number of access requests of the first API group and the processing speed of the second content service linked to the number of access requests of the second API group may be further compared (step S344*c*).

Here, the first content service and the second content service are different content services, and may be first-come-first-served draws, concert reservations related to course registration, accommodation reservations, ticket reservations, transportation reservations, and the like.

At this time, in the case that the processing speed of the first content service is slower than the processing speed of the second content service (Yes in step S344*d*), the processor 110 may further extract the preset seventh target traffic processing number of the first API group to reduce traffic (step S344*e*).

In addition, in the case that the processing speed of the second content service is slower than the processing speed of the first content service (No in step S344*d*), the processor 110 may further extract the preset eighth target traffic processing number of the second API group set to reduce traffic (step S344*f*). Here, the seventh target traffic processing number may be different from the eighth target traffic processing number.

Meanwhile, although not shown, the traffic control server 100 of the present disclosure may further include an output module and an input module.

The output module may display a user interface UI for providing information related to an operation implemented in the traffic control server 100. The output module may output any form of information generated or determined by the processor 110 and any form of information received by the communication module 130.

The output module may include at least one of a liquid crystal display (LCD), a thin film transistor-liquid crystal display (TFT LCD), an organic light-emitting diode (OLED), a flexible display, and a three-dimensional display (3D display). Some of these display modules may be configured as transparent or light-transmitting so that the outside may be seen through them. This may be referred to as a transparent display module, and a representative example of the transparent display module is TOLED (Transparent OLED), and the like.

The input module may receive information input by a user. The input module may be provided with keys and/or buttons on a user interface for receiving information input by a user, or physical keys and/or buttons. A computer program for controlling a display according to embodiments of the present disclosure may be executed according to user input through an input module.

At least one component may be added or deleted in accordance with the performance of the components illustrated in FIGS. 1 and 2, and FIGS. 4 to 10. In addition, it will be readily understood by those skilled in the art that the mutual positions of the components may be changed in accordance with the performance or structure of the system.

FIGS. 3 and 11 to 14 describe the execution of multiple steps sequentially, but this is merely an example of the technical idea of the present embodiment, and those skilled in the art to which the present embodiment belongs may modify and change the order described in FIGS. 3 and 11 to 14 without departing from the essential characteristics of the present embodiment, or may execute one or more of the multiple steps in parallel, thereby allowing for various modifications and variations. Therefore, FIGS. 3 and 11 to 14 are not limited to a chronological order.

Meanwhile, the disclosed embodiments may be implemented in the form of a recording medium storing instructions executable by a computer. The instructions may be stored in the form of program codes, and when executed by a processor, may generate program modules to perform the operations of the disclosed embodiments. The recording medium may be implemented as a computer-readable recording medium.

The computer-readable recording medium includes all types of recording media storing instructions that may be deciphered by a computer. For example, there may be a ROM (Read Only Memory), a RAM (Random Access Memory), a magnetic tape, a magnetic disk, a flash memory, an optical information storage device, and the like.

Although the embodiments of the present disclosure have been described above with reference to the attached drawings, those skilled in the art will understand that the present disclosure may be implemented in other specific forms without changing the technical spirit or essential characteristics thereof. Therefore, it should be understood that the embodiments described above are exemplary in all respects and not restrictive.

According to the present disclosure, there is an effect of efficiently controlling traffic in a traffic generation section to efficiently allow an entry target to enter.

The effects of the present disclosure are not limited to the effects mentioned above, and other effects not mentioned will be clearly understood by those skilled in the art from the description.

What is claimed is:

1. A traffic control server based on influence calculation utilizing metric information, comprising:

a communication module configured to perform communication with user terminals attempting to enter a service server;

a memory configured to store at least one process related to a traffic control based on an impact calculation using metric information; and a processor configured to perform an operation according to the process, wherein the processor is configured to:

calculate the influence on the metric information based on a number of connection requests by API group of the user terminals received from the service server through the communication module and the metric information, output change information of the metric information based on the number of connection requests by API group and the influence, extract a preset target traffic processing number by API group in connection with the change information of the metric information, and control the service server to control the traffic based on the target traffic processing number by API group, wherein the processor is further configured to:

when extracting the target traffic processing number by API group, based on the change in the metric information being higher than a preset level, compare the number of connection requests of a first API group and the number of connection requests of a second API group, and when extracting the target traffic processing number by API group, based on the number of connection requests of the first API group being greater than the number of connection requests of the second API group, extract a preset first target traffic processing number of the first API group to be smaller than the number of connection requests of the first API group to reduce the traffic.

2. The server according to claim 1, wherein the processor is configured to:

calculate the influence based on the number of connection requests of the first API group and the number of connection requests of the second API group among the number of connection requests by API group, and CPU information, memory information, disk information, and network information included in the metric information.

3. The server according to claim 2, wherein the processor is configured to:

calculate the influence using an equation of a straight line based on a normal vector, using the number of connection requests of the first API group and the number of connection requests of the second API group, and at least one of the CPU information, the memory information, the disk information, or network information.

4. The server according to claim 2, wherein the processor is configured to:

based on the number of connection requests of the second API group being greater than the number of connection requests of the first API group, further extract a preset second target traffic processing number of the second API group to be smaller than the number of connection requests of the second API group to reduce the traffic.

5. The server according to claim 2, wherein the processor is configured to:

when extracting the target traffic processing number by API group, based on the change in the metric information being higher than a preset level, further compare an average usage time of a first content service linked to the number of connection requests of the first API group and an average usage time of a second content service linked to the number of connection requests of the second API group, based on the average usage time of the first content service being greater than the average usage time of the second content service, further extract a preset third target traffic processing number of the first API group set to reduce the traffic, and based on the average usage time of the second content service being greater than the average usage time of the first content service, further extract a preset fourth target traffic processing number of the second API group to reduce the traffic.

6. The server according to claim 2, wherein the processor is configured to:

when extracting the target traffic processing number by API group, based on the change in the metric information being higher than a preset level, further compare an average usage ranking of a first content service linked to the number of connection requests of the first API group and an average usage ranking of a second content service linked to the number of connection requests of the second API group, based on the average usage ranking of the first content service being faster than the average usage ranking of the second content service, further extract a preset fifth target traffic processing number of the first API group set to reduce the traffic, and based on the average usage ranking of the second content service being faster than the average usage ranking of the first content service, further extract a preset sixth target traffic processing number of the second API group to reduce the traffic.

7. The server according to claim 2, wherein the processor is configured to:

when extracting the target traffic processing number by API group, based on the change in the metric information being higher than a preset level, further compare a processing speed of a first content service linked to the number of connection requests of the first API group and a processing speed of a second content service linked to the number of connection requests of the second API group, based on the processing speed of the first content service being slower than the processing speed of the second content service, further extract a preset seventh target traffic processing number of the first API group set to reduce the traffic, and based on the processing speed of the second content service being slower than the processing speed of the first content service, further extract a preset eighth target traffic processing number of the second API group to reduce the traffic.

8. A traffic control system based on influence calculation utilizing metric information, comprising:

a service server configured to provide a content service;

user terminals attempting to enter the service server; and a traffic control server configured to perform communication with the service server and the user terminals, wherein the traffic control server is configured to:

calculate the influence on the metric information based on a number of connection requests by API group of the user terminals received from the service server and the metric information, output change information of the metric information based on the number of connection requests by API group and the influence, extract a preset target traffic processing number by API group in connection with the change information of the metric information, and control the service server to control the traffic based on the target traffic processing number by API group, wherein the traffic control server is further configured to:

when extracting the target traffic processing number by API group, based on the change in the metric information being higher than a preset level, compare the number of connection requests of a first API group and the number of connection requests of a second API group, and when extracting the target traffic processing number by API group, based on the number of connection requests of the first API group being greater than the number of connection requests of the second API group, extract a preset first target traffic processing number of the first API group to be smaller than the number of connection requests of the first API group to reduce the traffic.

9. The system according to claim 8, wherein the traffic control server is configured to:

calculate the influence based on the number of connection requests of the first API group and the number of connection requests of the second API group among the number of connection requests by API group, and CPU information, memory information, disk information, and network information included in the metric information.

10. The system according to claim 9, wherein the traffic control server is configured to:

calculate the influence using an equation of a straight line based on a normal vector, using the number of connection requests of the first API group and the number of connection requests of the second API group, and at least one of the CPU information, the memory information, the disk information, or network information.

11. The system according to claim 9, wherein the traffic control server is configured to:

based on the number of connection requests of the second API group being greater than the number of connection requests of the first API group, further extract a preset second target traffic processing number of the second API group to be smaller than the number of connection requests of the second API group to reduce the traffic.

12. The system according to claim 9, wherein the traffic control server is configured to:

when extracting the target traffic processing number by API group, based on the change in the metric information being higher than a preset level, further compare an average usage time of a first content service linked to the number of connection requests of the first API group and an average usage time of a second content service linked to the number of connection requests of the second API group, based on the average usage time of the first content service being greater than the average usage time of the second content service, further extract a preset third target traffic processing number of the first API group set to reduce the traffic, and based on the average usage time of the second content service being greater than the average usage time of the first content service, further extract a preset fourth target traffic processing number of the second API group to reduce the traffic.

13. The system according to claim 9, wherein the traffic control server is configured to:

when extracting the target traffic processing number by API group, based on the change in the metric information being higher than a preset level, further compare an average usage ranking of a first content service linked to the number of connection requests of the first API group and an average usage ranking of a second content service linked to the number of connection requests of the second API group, based on the average usage ranking of the first content service being faster than the average usage ranking of the second content service, further extract a preset fifth target traffic processing number of the first API group set to reduce the traffic, and based on the average usage ranking of the second content service being faster than the average usage ranking of the first content service, further extract a preset sixth target traffic processing number of the second API group to reduce the traffic.

14. The server according to claim 9, wherein the traffic control server is configured to:

when extracting the target traffic processing number by API group, based on the change in the metric information being higher than a preset level, further compare a processing speed of a first content service linked to the number of connection requests of the first API group and a processing speed of a second content service linked to the number of connection requests of the second API group, based on the processing speed of the first content service being slower than the processing speed of the second content service, further extract a preset seventh target traffic processing number of the first API group set to reduce the traffic, and based on the processing speed of the second content service being slower than the processing speed of the first content service, further extract a preset eighth target traffic processing number of the second API group to reduce the traffic.

* * * * *